United States Patent [19]

Steffy et al.

[11] Patent Number: 5,522,569
[45] Date of Patent: Jun. 4, 1996

[54] SATELLITE HAVING A STACKABLE CONFIGURATION

[75] Inventors: David A. Steffy, Herndon; Anthony D. Robinson, Leesbrug, both of Va.

[73] Assignee: Orbital Sciences Corporation, Dulles, Va.

[21] Appl. No.: 191,831

[22] Filed: Feb. 4, 1994

[51] Int. Cl.⁶ ........................................ B64G 1/10
[52] U.S. Cl. .................... 244/158 R; 244/161; 244/167; 244/173
[58] Field of Search ............................... 244/158 R, 161, 244/173, 167, 164

[56] References Cited

U.S. PATENT DOCUMENTS

| | | | |
|---|---|---|---|
| 2,835,548 | 5/1958 | Baumann | 244/158 R |
| 2,976,806 | 3/1961 | Risk et al. | 244/158 R |
| 3,420,470 | 1/1969 | Meya | 244/158 R |
| 3,459,391 | 8/1969 | Haynos | 244/173 |
| 4,133,501 | 1/1979 | Pentlicki | 244/173 |
| 4,133,502 | 1/1979 | Anchutin | 244/173 |
| 4,506,852 | 3/1985 | Adams et al. | 244/161 |
| 4,607,815 | 8/1986 | Turci et al. | 244/161 |
| 4,747,567 | 5/1988 | Johnson et al. | 244/173 |
| 4,834,325 | 5/1989 | Faget et al. | 244/167 |
| 4,880,187 | 11/1989 | Rourke et al. | 244/158 R |
| 4,988,060 | 1/1991 | Janson et al. | 244/173 |
| 5,052,640 | 10/1991 | Chang | 244/173 |
| 5,104,070 | 4/1992 | Johnson et al. | 244/161 |
| 5,129,601 | 7/1992 | Henkel | 244/161 |
| 5,199,672 | 4/1993 | King et al. | 244/164 |

OTHER PUBLICATIONS

J. R. Wertz, ed., *Spacecraft Attitude Determination and Control*, Chapter 5—"Modeling the Space Environment," pp. 113–152, 1978.
W. J. Larson and J. R. Wertz, eds., *Space Mission Analysis and Design*, Chapter 10—"Spacecraft Design and Sizing," pp. 285–337 (2d ed. 1992).

*Primary Examiner*—Galen L. Barefoot
*Attorney, Agent, or Firm*—Jenner & Block

[57] ABSTRACT

A satellite has two solar array panels which are moveable between a closed configuration and an open configuration. The solar array panels are pivotably mounted on hinges attached along the top and bottom of the satellite and extend outwardly from the top and bottom of the satellite in the open configuration. The height of the perimeter sidewall is selected such that the satellite has a generally oblate configuration. Each solar array panel has a surface area substantially equal to that of the satellite cross-sectional area. The hinges are mounted on pintles extending from a solar array drive motor which rotates the solar panel about the axis defined by the pintles to provide one axis sun tracking. The solar array panels are pivoted about the axes of the hinges until substantially parallel to the top and bottom of the satellite to form a compact, stackable configuration of the satellite for stowage. Three couplers positioned along the perimeter wall couple the satellite to similarly configured satellites within the fairing of a launch vehicle. The coupled satellites form a stack having three load-bearing columns consisting of the satellite couplers. In the stacked configuration, the couplers of one satellite are attached to the couplers of adjacent satellites by bolts restrained within non-explosive separation nuts. Pre-loaded compression springs extend between the couplers of adjacent satellites. After the stack of satellites separates from the fairing, each satellite is successively deployed from the stack, starting with the top-most satellite. Deployment begins by activating the non-explosive separation nuts in the couplers of the top-most satellite. Thereafter, the pre-loaded compression springs extending between the coupling devices of the top-most satellite and the subjacent satellite (or, for the bottom-most satellite, the subjacent booster stage) accelerate the top-most satellite away from the stack and booster stage.

33 Claims, 7 Drawing Sheets

SATELLITE HAVING A STACKABLE CONFIGURATION

FIELD OF THE INVENTION

This invention relates generally to satellites, and more particularly to satellites which are transported in a stacked configuration within the payload fairing of a launch vehicle prior to being placed into space.

BACKGROUND OF THE INVENTION

There exist several design constraints for satellites or other spacecraft which are contained within the payload fairing of a launch vehicle during their launch into space. Launching satellites and other spacecraft into space is expensive. Consequently, it is desirable to have satellite configurations of minimum weight and volume and that use the maximum amount of the volume within the fairing. It is also desirable for the configuration of a satellite to be adapted for housing more than one satellite within the fairing. However, housing multiple satellites within the fairing creates additional constraints on their design configuration. For example, when there are multiple satellites, each can be subjected to additional loads during the acceleration of the launch vehicle. This is especially true for the satellites located toward the bottom of the fairing if they must support the weight of the overlying satellites.

Several types of stacking arrangements have been proposed to accommodate the competing needs to maximize the utilization of space within the fairing and yet protect the satellites from loads experienced during launch. For example, King et al., U.S. Pat. No. 5,199,672 entitled "Method And Apparatus For Deploying A Satellite Network" discloses pallets disposed in a stacked configuration within the fairing. Each pallet mounts up to four satellites and includes a centrally located kick motor. The satellites in each layer are supported only by the pallet to which they are mounted thereby lessening the loads transferred to satellites which are lower in the stack. In addition, the central column of kick motors helps absorb the loads generated during acceleration thereby further protecting the satellites from these loads. However, this stacking arrangement suffers from the disadvantage that the mass and size of the satellites is limited by the mass and volume of the pallets. In addition, the central column of kick motors must be designed to withstand loads generated during launch.

StackSat is another example of stacked multiple spacecraft that have flown. In these, typically the lower spacecrafts suffer a substantial mass penalty because they must support the rest of the stack. The Ariane SPELDA and other vehicles have used a shell structure in which a lower satellite in the fairing is encased within a protective shell structure which supports the mass of an overlying satellite. However, the mass and volume of the shell diminishes that available for the satellites. Moreover, if the shell fails to open, the enclosed satellite cannot be deployed. An advantage of the shell is that it carries all the loads of the upper spacecraft so the structure of the lower one need not be strengthened.

The configuration of a satellite which is transported by a launch vehicle is further constrained by the need to provide energy to the satellite once it has been placed into orbit. Typically, arrays of solar panels are used to provide energy. In many previous satellite configurations, the arrays extend from the outer faces of the sidewalls of the satellite. When the satellite is stored within the fairing, the arrays are folded against the sides of the satellite to conserve space. The arrays are then deployed once the satellite is in orbit. Because the power generated by the solar panels is proportional to the surface area of the panels, satellites may require articulated panels which can be folded to fit within the fairing. The combined area of the articulated panels provides the required larger surface area when the panels are unfolded in orbit. However, increasing the number of articulations to provide a larger surface area also increases the cost of the satellite, complicates construction and testing of the satellite, and reduces the reliability of the panels during deployment and use.

It is therefore an object of this invention to provide a satellite configuration wherein several satellites of the same configuration can be stacked within the fairing of a launch vehicle.

Another object of this invention is to provide a stackable satellite configuration which maximizes the utilization of the space within the fairing.

A further object of this invention is to provide a stackable satellite configuration which protects the satellites from loads experienced during launching.

Another object of this invention is to provide a stackable satellite configuration in which the satellites have solar panels which provide a large surface area without excessive articulation.

Another object of this invention is to provide a stackable satellite configuration which protects the solar panels of the satellite during launching.

A further object of this invention is to provide a coupling device for coupling together satellites in a stack, wherein the coupling devices protect the satellites from loads experienced during launching.

Another object of this invention is to provide a coupling device for coupling together satellites in a stack, wherein the weight of the satellites is not substantially limited by the weight due to the coupling devices.

These and other objects will become apparent from the following description.

SUMMARY OF THE INVENTION

A satellite having a stackable configuration according to the invention includes a shelf for mounting equipment and a perimeter wall attached to and extending from the shelf. The inner face of the perimeter wall defines the interior of the satellite, in which various equipment can be stored. The height of the perimeter wall is chosen such that the satellite has a generally oblate or disk-shaped configuration. The satellite also includes two solar panels attached by hinges to the top and bottom of the satellite. The solar panels are moveable between a closed configuration, in which the solar panels are substantially parallel to the shelf, and an open configuration in which the solar panels extend at an angle relative to the shelf. In the preferred embodiment, the hinges have springs which bias the solar panels towards the open configuration and thus move the solar panels from the closed configuration to the open configuration.

A stack of satellites according to the invention includes a plurality of coupling devices for coupling together each satellite in the stack. Each of the satellites in the stack has, in addition to the features listed above, a plurality of such coupling devices attached to and symmetrically positioned along the perimeter wall of the satellite. Each coupling device includes a bracket having opposed flanges which extend beyond the top and bottom of the satellite perimeter wall, and first and second pairs of shear fittings. The first pair of shear fittings is attached to and extends through the first bracket flange and the second pair of shear fittings is attached to and extends through the second bracket flange. Each shear fitting of the first pair of shear fittings has an extension member extending beyond the first bracket flange away from the satellite and parallel to the perimeter wall. The extension member has a tubular first portion and a tapered second portion having a flat surface on its distal end. The tubular first portion of the extension member extends between the first bracket flange and the tapered second portion of the extension member. The second portion has a diameter (or other dimension in the case of second portions not having a circular cross-section) which decreases from the junction with the tubular portion to its end. Each shear fitting of the second pair of shear fittings includes a cup-shaped extension which is accessible through the outer surface of the second bracket flange. Each cup-shaped extension defines a concave recess within the second bracket flange. The concave recess of the cup-shaped extension is shaped to accommodate the surface of the second portion of the extension member of the first pair of shear fittings. When two or more satellites which include these coupling devices are stacked together, the satellites are positioned such that each of the coupling devices on one satellite overlies one of the coupling devices on the subjacent satellite in the stack. In this configuration, each of the first pairs of shear fittings on the coupling devices of the upper satellite is placed within the recesses of the cup extensions of the second shear fittings of the coupling devices on the subjacent satellite.

DETAILED DESCRIPTION

Figure 1:
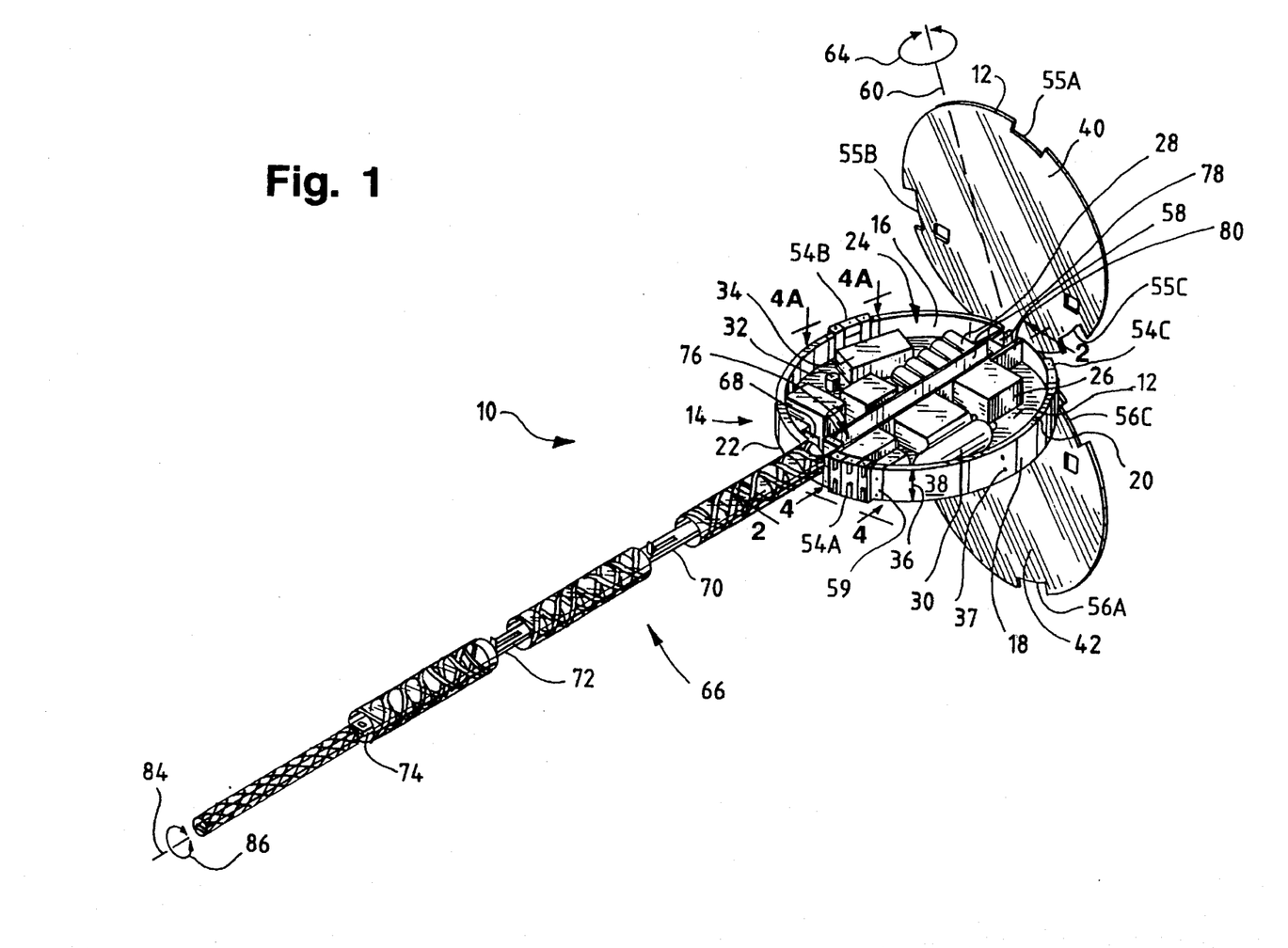
FIG. 1 is a perspective view of a deployed satellite according to the invention.

Referring now to the drawings, FIG. 1 is a perspective view of a deployed satellite 10 according to the invention. Satellite 10 includes a planar payload shelf 12 attached to a circular perimeter wall 14. Perimeter wall 14 includes an inner face 16, an outer face 18, and two opposed edges 20 and 22. Inner face 16, together with planar shelf 12, defines an interior 24 of satellite 10 in which components of satellite 10 are generally located. Interior 24 can hold, for example, a suitable computer 26, batteries 28, nitrogen tank 30, sensors 32, and a receiver 34. In the preferred embodiment shown in FIG. 1, payload shelf 12 is disk-shaped and ring-shaped perimeter wall 14 is attached by conventional methods to payload shelf 12 at inner face 16 near edge 22. The height of perimeter wall 14 is shown by line 36. In the preferred embodiment, height 36 is selected such that satellite 10 has a generally oblate configuration. Thrusters 37 positioned along perimeter 14 are used, for example, to place satellite 10 in the final orbital position.

Payload shelf 12 is constructed from an aluminum honeycomb core which, in the preferred embodiment, is about 0.405 inch thick. A metallic skin is attached to both planar surfaces of the honey-combed core with a suitable adhesive, such as FM73M film adhesive available from American Cyanamid, to form payload shelf 12. Payload shelf 12 is attached to perimeter wall 12 by a plurality of F-brackets (not shown), each of which is riveted to both payload shelf 12 and perimeter wall 14. Payload shelf 12 and perimeter wall 14 are also adhesively bonded to each F-bracket by a suitable adhesive, such as Hysol's EA 9309.3NA. Perimeter wall 14 also has an aluminum honeycomb core and, in the preferred embodiment, is about one inch thick. Metallic skin 38 is attached to inner face 16 and outer face 18 with a suitable adhesive, such as FM73M film adhesive available from American Cyanamid. In the preferred embodiment, the metallic skin on shelf 12 and wall 14 is made from an aluminum-beryllium alloy, such as AlBeMet 150 available from Brush-Wellman.

Figure 3:
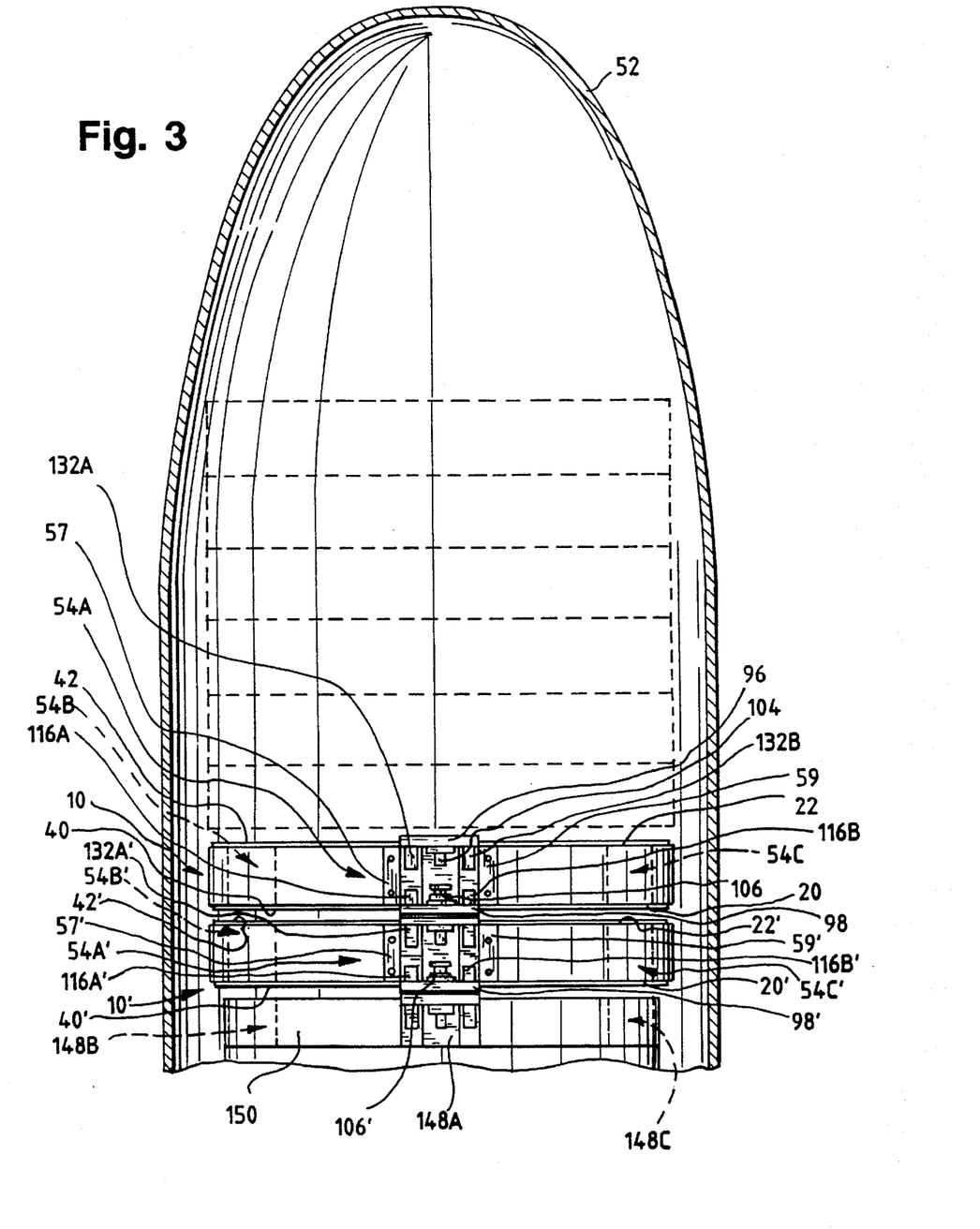
FIG. 3 is a partially cut away cross-sectional view of a payload fairing containing eight stacked satellites according to the invention.
Figure 4:
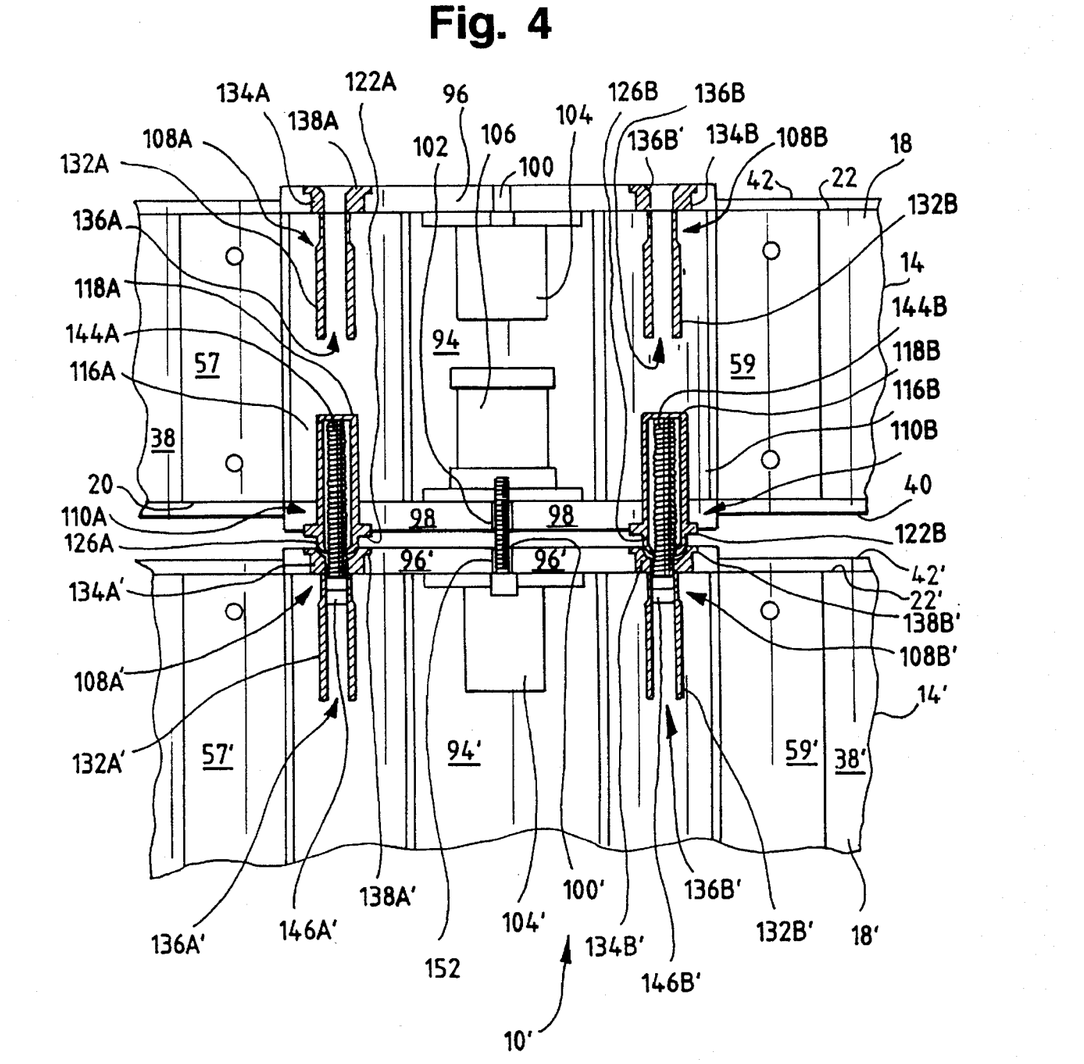
FIG. 4 is a partially cut away, close-up sectional view through the faces of the brackets coupling the satellites together in FIG. 3, in the general direction of the line 4—4 in FIG. 1.
Figure 4A:
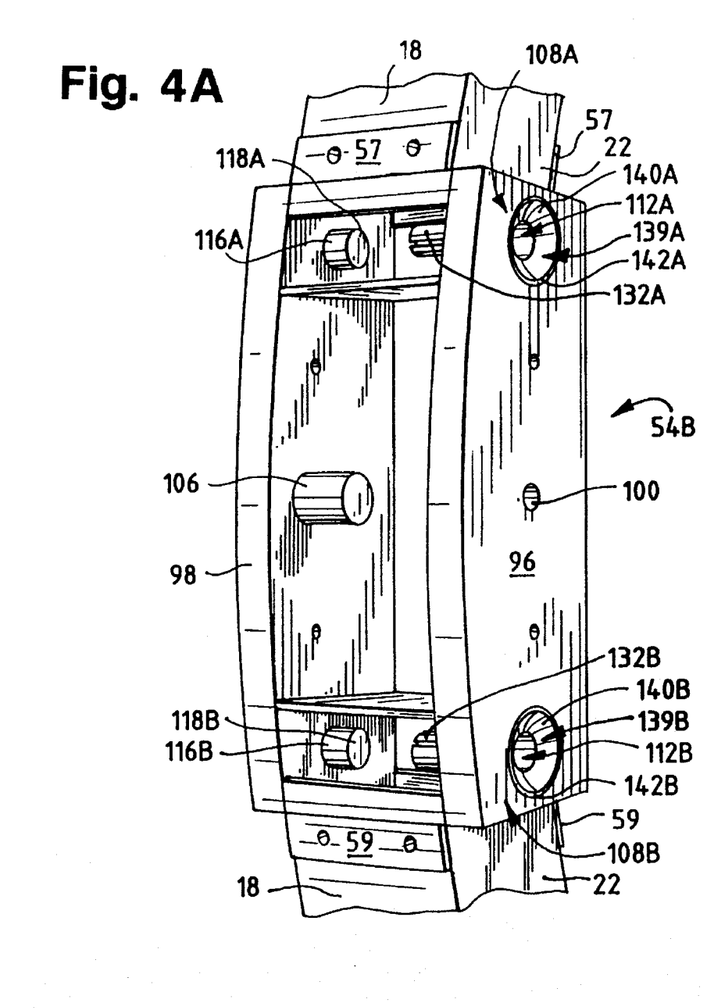
FIG. 4A is partially cut-away top perspective view in the direction of line 4A—4A in FIG. 1, showing the top of the perimeter wall and one of the couplers in FIG. 1.
Figure 4B:
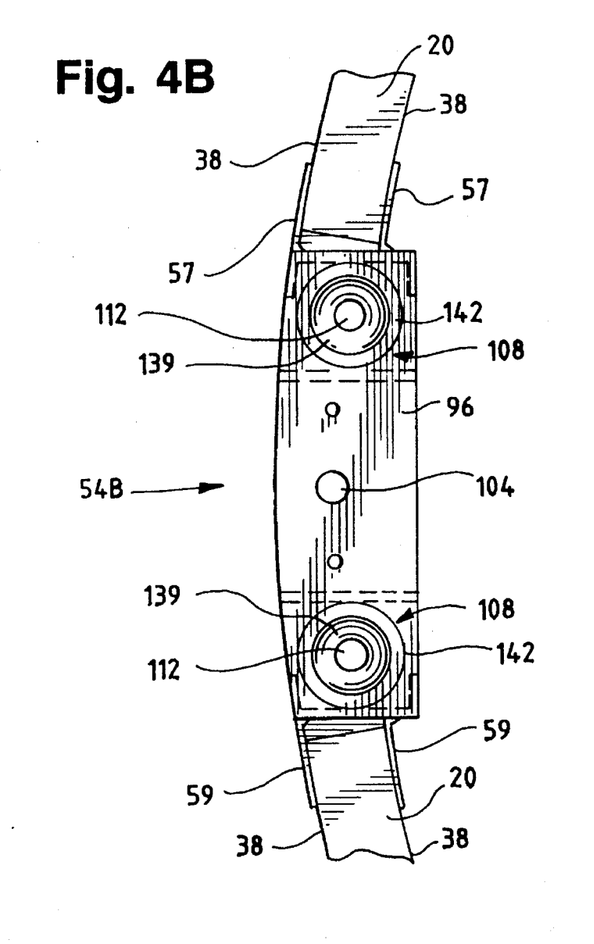
FIG. 4B is a top plan view of the coupler in FIG. 4A.

Satellite 10 also includes a pair of solar panels 40 and 42 which, when deployed, generally extend outwardly from and perpendicular to shelf 12. Solar panels 40 and 42 are attached to satellite 10 by a pair of hinges 44 and 46, shown in FIGS. 1A and 2. In the preferred embodiment, hinges 44 and 46 are attached to the drive shaft of a solar array drive motor 58, as explained in more detail below. Alternatively, hinges 44 and 46 can be attached by conventional methods to edges 22 and 20 of perimeter wall 14. Hinges 44 and 46 permit solar panels 40 and 42 to be pivoted toward payload shelf 12 until solar panels 40 and 42 are substantially parallel to and overlie payload shelf 12, as shown in FIG. 2. Folding solar panels 40 and 42 in this manner creates a compact, stackable configuration of satellite 10 for stowage in the payload fairing of a launch vehicle, such as payload fairing 52 shown in FIG. 3. Three couplers 54A–C symmetrically positioned along perimeter wall 14 are used to secure a plurality of satellites 10 in a stacked configuration within payload fairing 52. Couplers 54A–C are mounted, respectively, in the three gaps between three sections of perimeter wall 14 and extend slightly into interior 24 of satellite 10, as best seen in FIGS. 1 and 4A. Consequently, in the preferred embodiment, each solar panel 40 and 42 includes three recesses, 55A–C and 56A–C, respectively, which accommodate couplers 54A–C when solar panels 40 and 42 are in the closed configuration, as shown in FIGS. 2 and 3. Couplers 54A–C also have curved side extensions 57 and 59 which are concentric with and fit snugly against the inner face 16 and outer face 18 of perimeter wall 14, as best seen in FIGS. 4A and 4B. Skin 38 is adhesively attached to side extensions 57 and 59 with a suitable adhesive, such as Hysol EA 9309NA, available from Hysol Aerospace Division of the Dexter Group. Rivets may also be used to attach extensions 57 and 48 to perimeter wall 14.

Solar panels 40 and 42 are deployed into the open configuration shown in FIG. 1 (or at another desired angular orientation in which panels 40 and 42 are parallel or co-planar) after satellite 10 has been launched into space and reached the appropriate point in its trajectory. As noted above, in the closed configuration when stacked within fairing 52, solar panels 40 and 42 are pivoted about hinges 44 and 46 until substantially parallel to payload shelf 12, one on top and one on the bottom of satellite 10. Consequently, solar panels 40 and 42 can have a large surface area of substantially the same size as payload shelf 12. Conventional satellites, on the other hand, have solar panels which are stowed against the perimeter side wall of the satellites during launch. The top and bottom of satellite 10 have a larger surface area than could a pair of flat panels stowed against sidewall 14. If panels stowed against wall 14 were used instead of panels 40 and 42, such panels could require articulation so that they could be unfolded after launch to provide a larger surface area. Thus, solar array panels 40 and 42 provide large surface areas without the articulation required in some conventional satellite configurations.

Figure 1A:
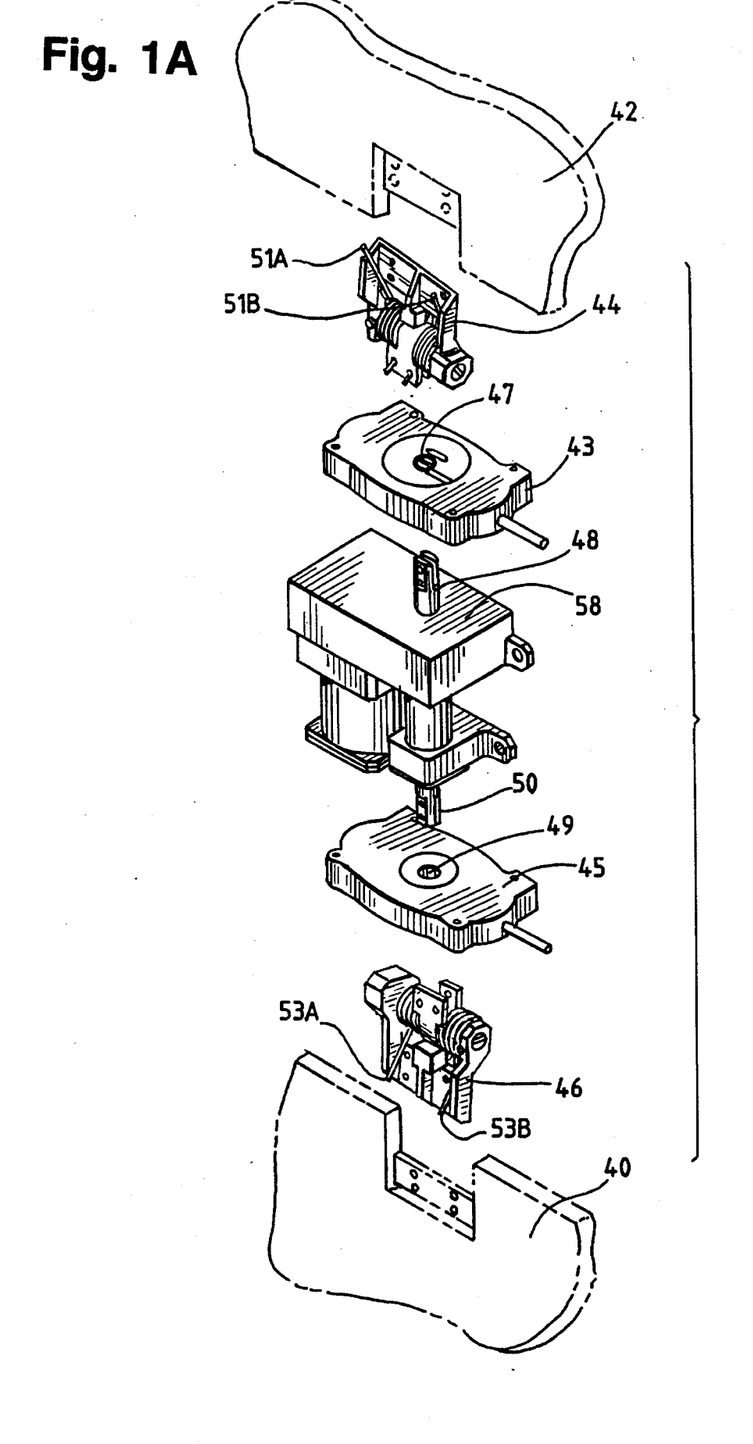
FIG. 1A is an exploded view of the solar array drive assembly shown in FIG. 1.
Figure 2:
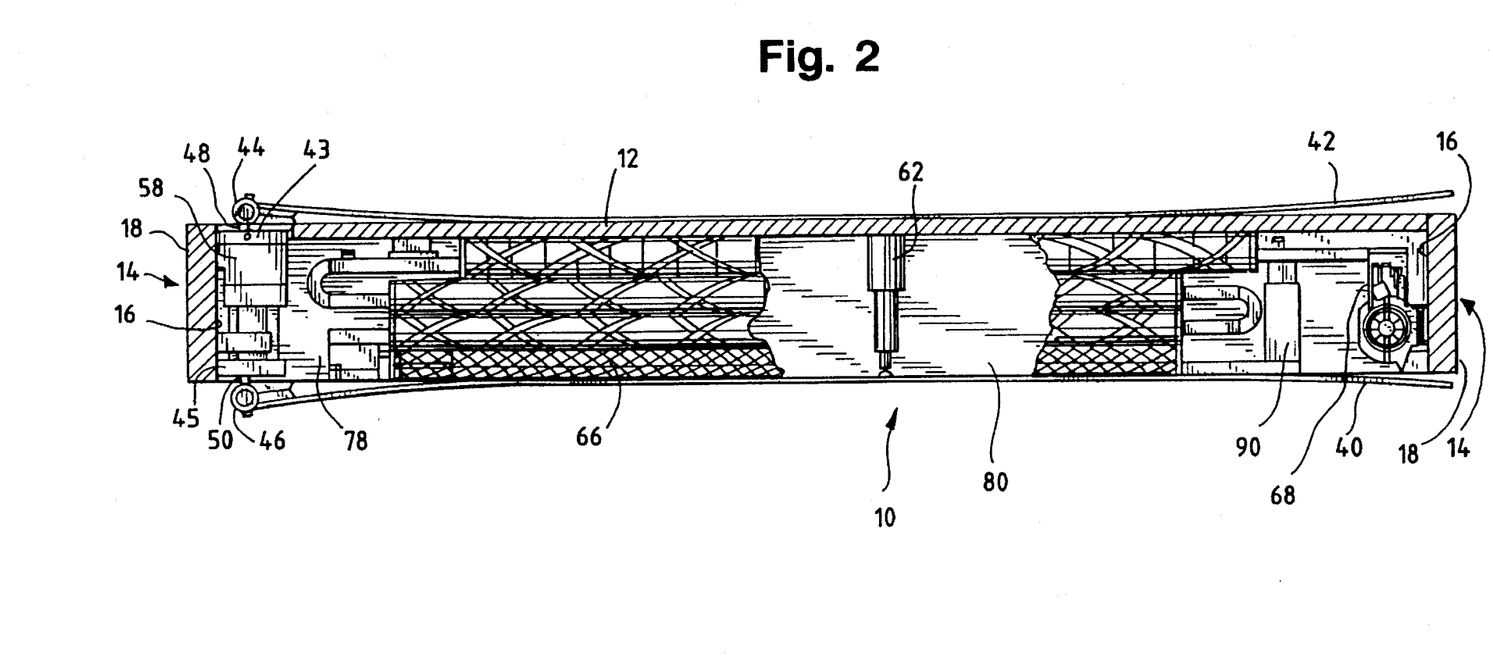
FIG. 2 is a cross-sectional view through the center of the satellite in the direction of line 2—2 in FIG. 1 when the satellite is in a closed, stackable configuration.

As noted above, in the preferred embodiment satellite 10 includes a solar array drive motor 58, illustrated in FIGS. 1, 1A and 2. Drive motor 58 is attached to the inner face 16 of perimeter wall 14 by conventional methods such as bolts or rivets. The drive shaft of motor 58 extends outwardly from the top and bottom surface of motor 58 thus forming pintles 48 and 50 on which hinges 44 and 46 are rotatably mounted. In the preferred embodiment, satellite 10 also includes a pair of twist capsules 43 and 45 which provide rotary connections for transferring power and data to and from solar array panels 40 and 42 as panels 40 and 42 rotate and throughout their range of rotation. Twist capsules 43 and 45 are attached by bolts or rivets to the inner face 16 of perimeter wall 14 above and below, respectively, drive motor 58. Each twist capsule 43 and 45 includes a central opening 47 and 49 through which pintles 48 and 50 extend. In addition, solar panel 42 includes an opening sized to accommodate hinges 44 and 46, as best seen in FIGS. 1A and 2. Hinges 44 and 46 are mounted on the ends of pintles 48 and 50, respectively, and thus panels 40 and 42 are operatively connected to drive motor 58, which rotates solar panels 40 and 42 about an axis 60 defined by pintles 48 and 50. The direction of rotation of solar panels 40 and 42 is shown generally in FIG. 1 by arrow 64. By rotating solar panels 40 and 42 in this manner, solar panels 40 and 42 can track the sun as satellite 10 traverses its orbital or other trajectory so as to maximize their exposure to the sun. In the preferred embodiment, drive motor 58 rotates solar panels 40 and 42 up to 160° in either direction about axis 60 to provide one axis of sun tracking.

Referring to FIG. 1, in the preferred embodiment satellite 10 also includes an articulated antenna assembly 66 which is attached to perimeter wall 14 by a hinge 68. Antenna 66 and hinge 68 are described in the co-pending application entitled "Self-Deploying Helical Structure," filed on Feb. 4, 1994, Ser. No. 08/192,324, which is assigned to the same assignee as the present application, and the entire disclosure of which is hereby incorporated by reference. When solar panels 40 and 42 are in the closed configuration, for example when satellite 10 is stowed within payload fairing 52, antenna 66 is folded about hinges 70, 72, and 74 to form a compact, non-extended structure, as shown in FIG. 2. Pivoting antenna 66 about hinge 68 then positions antenna 66 within the interior 24 of satellite 10. In the preferred embodiment, satellite 10 includes an antenna chamber 76 formed by two longitudinal walls 78 and 80 attached to payload shelf 12 preferably along the geometric center of satellite 20, on the interior 24 of satellite 10. Thus, pivoting antenna 66 about hinge 68 positions antenna 66 within antenna chamber 76. Thereafter, solar panels 40 and 42 are pivoted about hinges 44 and 46 so that in the closed configuration antenna 66 is stowed between payload shelf 12 and solar panel 40.

Satellite 10 can also include a magnetic attitude control system which includes an electromagnet, as is known in the art. Energizing the electromagnet creates a magnetic field in satellite 10 which interacts with the Earth's magnetic field to align the electromagnet with respect to the Earth's magnetic field. In addition, mass can be added near the distal end of antenna 66 to provide gravity gradient steering.

Yaw control of satellite 10 can also be provided by the magnetic or other suitable attitude control system about axis 84 of antenna 66 in the deployed position shown in FIG. 1. The direction of the yaw motion of satellite 10 is shown generally by arrow 86. Yaw of satellite 10 about axis 84 is substantially perpendicular to the rotational movement of solar panels 40 and 42 around axis 60 thereby providing a second axis of movement. The yaw of satellite 10 and the rotation of solar panels 40 and 42 thus provides two-axis positioning of solar panels 40 and 42.

FIG. 2 is a cross-sectional view along line 2—2 in FIG. 1 illustrating satellite 10 when solar panels 40 and 42 are in the closed configuration and antenna 66 is retracted within antenna chamber 76. A lanyard nonexplosive actuator 90 restrains antenna 66 in the retracted position when antenna 66 is stored within satellite 10. Hinge 68 includes biasing means for biasing antenna 66 outward to the extended position shown in FIG. 1. A suitable hinge 68 is described in the co-pending application entitled "Shear Viscous Damped Hinge," filed on Feb. 4, 1994, Ser. No. 08/191,246, which is assigned to the same assignee as the present invention, and the entire enclosure of which is hereby incorporated by reference. In the closed configuration shown in FIG. 2, antenna 66 is restrained within interior 24 by solar panel 40. Hinges 44 and 46 also contain suitable biasing elements, such as springs 51A–B and 53A–B shown in FIG. 1A, which bias solar panels 40 and 42 toward the open configuration shown in FIG. 1. Satellite 10 therefore also includes a restraining device, shown schematically at 62, for restraining solar panels 40 and 42 in the closed configuration shown in FIG. 2. In the preferred embodiment, solar panel restraining device 62 is a double lanyard nonexplosive actuator. A suitable double lanyard non-explosive actuator is available from G & H Technology, Inc., model number 8036-100. When satellite 10 is at the desired point in its trajectory, restraining device 62 is activated to release solar panels 40 and 42 and the hinge biasing elements 51A–B and 53A–B move solar panels 40 and 42 outwardly toward the open configuration, thus clearing the way for antenna 66 to be deployed outwardly toward the extended position.

When solar panels 40 and 42 are in the closed configuration, satellite 10 can be stowed within payload fairing 52 of a launch vehicle, as shown in FIG. 3. A second of the eight satellites stacked within fairing 52, designated satellite 10', has all the same features as satellite 10, as do the other six satellites shown by dashed lines. In other embodiments, fewer or more than eight satellites can be stacked in accordance with this invention. The components of satellite 10' are referenced by primed numbers corresponding to the reference numbers for satellite 10. Satellite 10 is placed over satellite 10' so that couplers 54A, 54B, and 54C directly overlie couplers 54A', 54B' and 54C', respectively. In the preferred embodiment, payload shelves 12 and 12' can have diameters almost as large as the internal diameter of fairing 52. In the embodiment illustrated in FIG. 3, all eight satellites stacked within fairing 52 have the same diameter and height 36. In alternative embodiments, the cross-sectional areas and heights of the various satellites need not be identical so long as couplers 54A, 54B and 54C on the various satellites are aligned. By keeping heights 36 and 36' short relative to the diameters of payload shelves 12 and 12' while simultaneously maximizing the diameters of payload shelves 12 and 12' relative to the internal diameter of fairing 52, the closed, stackable configurations of satellites 10 and 10' results in an efficient use of the loading volume of fairing 52. In FIG. 3, the approximate location of six additional satellites is shown in phantom outlines. With reference to FIGS. 1, 3, and 4, each satellite in the stack contains three identical couplers 54A, 54B, and 54C. In the stacked configuration, these couplers form three load-bearing columns comprised of the 54A couplers, 54B couplers, and 54C couplers, respectively.

FIG. 4 is a partially cut-away cross sectional view across the faces of the satellite interface attachment brackets or couplers 54A and 54A' showing the components of couplers 54A and 54A' in more detail. For ease of explanation, reference is made primarily to coupler 54A. Coupler 54A' includes like components, referenced by primed numbers, as coupler 54A. Coupler 54A includes a bracket 94 attached to perimeter wall 14. In the preferred embodiment, bracket 94 is constructed from an aluminum-beryllium alloy such as AlBeMet 150, available from Brush-Wellman. Two flanges 96 and 98 are located on opposite sides of bracket 94 and extend slightly above and below edges 22 and 20 of perimeter wall 14. Both flanges 96 and 98 have centrally located bore holes, 100 and 102, respectively. A hollow bolt catcher 104 is attached to flange 96 immediately below bolt hole 100. A non-explosive separation nut 106 is attached to flange 98 immediately above bolt hole 102. A suitable nonexplosive separation nut is available from G & H Technology, Inc., model number 9421-2.

Figure 5:
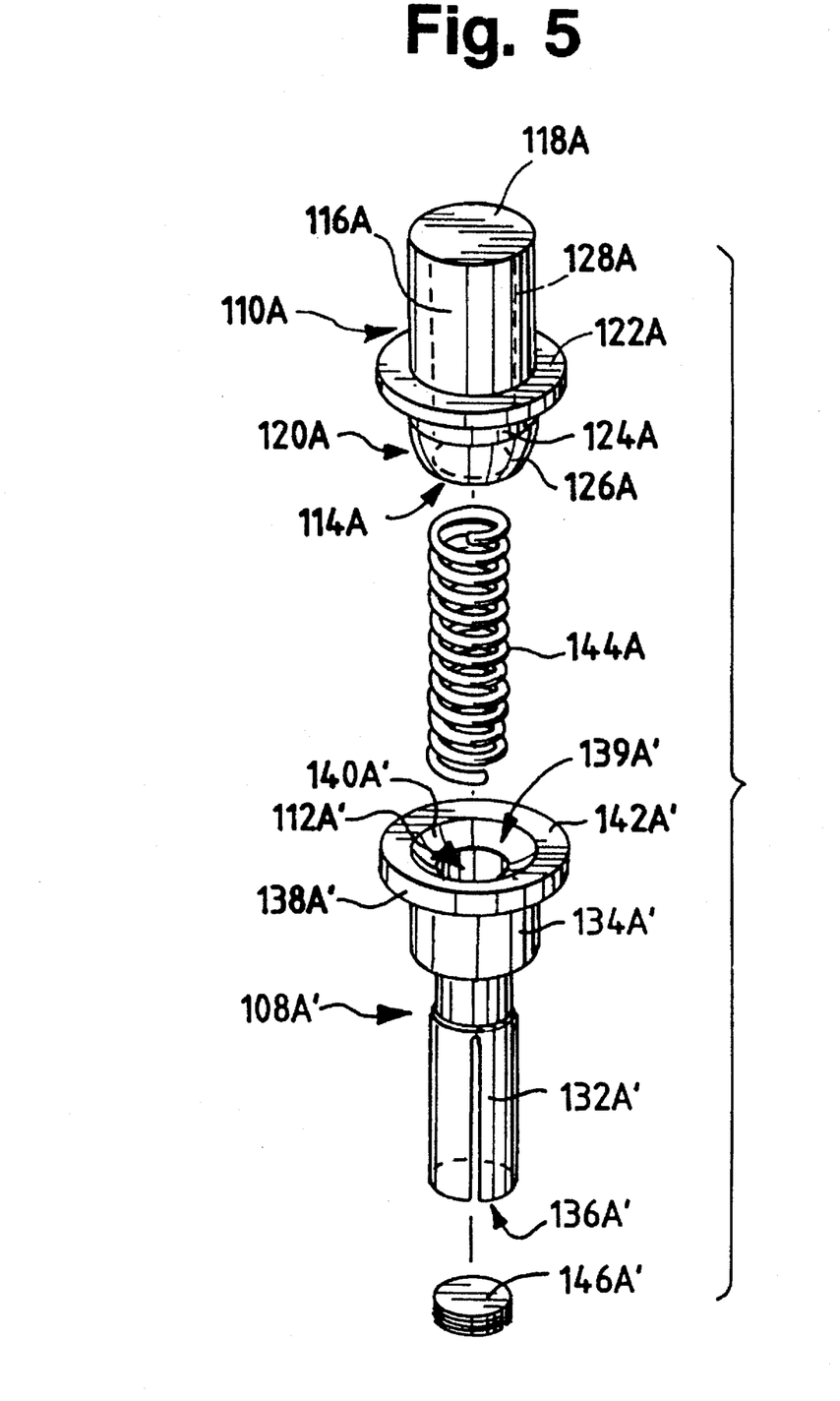
FIG. 5 is an exploded perspective view of two of the mated shear fittings/which form part of the brackets in FIG. 4 and of the separation spring and spring adjuster contained within each shear fitting.

Coupler 54A also includes four tubular shear fittings, 108A–B and 110A–B. Shear fittings 108A–B are press fit within openings in flange 96 as best seen in FIGS. 4, 4A, and 4B. Shear fittings 110A–B extend through flange 98 and are positioned in axial alignment with and opposite shear fittings 108A–B, as shown in FIG. 4. Shear fittings 108A–B include centrally located bores 112A–B, respectively, which provide pathways into tubular shear fittings 108A–B. Similarly, shear fittings 110A–B include centrally located bores which provide pathways into shear fittings 110A–B. Bore 114A of shear fitting 110A and bore 112A' of shear fitting 108A' are shown in FIG. 5. When satellites 10 and 10' are stacked within fairing 52, as shown in FIGS. 3 and 4, shear fittings 110A–B of brackets 54A–C immediately overlie and contact shear fittings 108A'–B' of brackets 54A'–C'. This stacking configuration also aligns bores 114A–B of shear fittings 110A–B with bores 112A'–B' of shear fittings 108A'–B', respectively, thereby creating continuous tubular chambers extending through the interiors of both shear fittings 108A'–B' on lower satellite bracket 54A' and of shear fittings 110A–B of upper satellite bracket 54A.

FIG. 5 is an exploded view of one pair of shear fittings 110A and 108A'. Shear fitting 110A is one of the lower shear fittings 110A–B of upper satellite bracket 54A in FIG. 5. As can be seen more clearly in FIG. 5, shear fitting 110A includes a top extension 116A, a top 118A and a bottom extension 120A. A ring-like flange 122A defines the intersection between top extension 116A and bottom extension 120A and facilitates press fitting shear fitting 110A into flange 98. Bottom extension 120A includes a cylindrical portion 124A attached to and extending away from flange 122A and perimeter wall 14. In the embodiment shown, the diameter of cylindrical portion 124A is approximately equal to the diameter of top extension 116A; however, portions 124A and 116A need not have the same diameters. A lower wall portion 126A extends from cylindrical portion 124A to the end of shear fitting 110A. The diameter (or other dimension in embodiments where the cross-section of portion 124A is not circular) of lower wall portion 126A decreases between cylindrical portion 124A and the end of shear fitting 110A. In the preferred embodiment, the exterior surface of lower wall portion 126A is a section of a sphere. In other embodiments, the external surface of portion 126A could be cone-shaped, completely spherical or any other tapered shape. Fitting 110A also has a circular bore 128A extending from opening 114A to top wall 118A for receiving a spring 144A. When shear fitting 110A is press fit into flange 98 of bracket 54A, ring-like flange 122A extends slightly beyond lower flange 98 of bracket 54A. Consequently, bottom extension 120A extends below bracket 54A, as can be seen in FIGS. 4 and 5. Alternatively, flange 122A could be configured to be press fit flush (i.e., substantially co-planar) with flange 98.

Shear fitting 108A' is one of the upper shear fittings 108A'–B' of bracket 54A' for lower satellite 10' shown in FIG. 4. With reference to FIG. 5, shear fitting 108A' comprises a round flange portion 138A', a smaller diameter portion 134A' adjacent to flange 138A', and an extension 132A'. Portions 134A' and 138A' are adapted to be press fit into a suitable opening in flange 96' and positioned so that the top surface 142A' of round flange 138A' is substantially co-planar with flange 96A'. Flange 138A' and portion 134A' contain a concave opening (i.e., a "cup") 139A' adapted to engage portion (i.e., a "cone") 126A of fitting 110A. When bracket 54A of satellite 10 is stacked on top of bracket 54A' of satellite 10', cone 126A of shear fitting 110A is positioned within cup 139A' of shear fitting 108A'. Lower wall portion (cone) 126A of shear fitting 110A thus cooperates with concave recess (cup) 139A' of shear fitting 108A' to form a cup and cone assembly for joining coupler 54A to coupler 54A'. A compression spring 144A fits inside the continuous circular bore within fittings 110A and 108A' when cone 126A is placed in cup 139A'. Spring 144A is restrained within fitting 110A by upper wall 118A. Preferably, the circular bore within extension 132A' is threaded to receive a spring tensioning screw 146A' threaded through opening 136A' into extension 132A' to restrain spring 144A within fitting 108A'. Thus, threading screw 146A' into and out of extension 132A' increases or decreases the compression, and thus the spring bias, of spring 144A. In the preferred embodiment, each of the shear fittings 110A–B and 108A'–B' is made from a titanium-aluminum alloy, preferably Ti-6Al-4V, which is commercially available. In addition, the external surfaces of cone 126A and cup 139A' are electroplated with NEDOX which is the tradename for a nickel alloy infused with TEFLON and which is available from General Magnaplate.

Referring now to FIGS. 3–5, satellites 10 and 10' are stacked within fairing 52 in the following manner. Fairing 52 includes three brackets or stage couplers 148A–C secured to a booster stage 150, as shown in FIG. 3. Stage couplers 148A–C are positioned on stage 150 to mirror the configuration of the satellite couplers 54A–C. Stage couplers 148A–C include components which are similar to shear fittings 108A–C in both form and function. A first satellite, in this case satellite 10', is placed within fairing 52 above stage 150 and positioned such that satellite couplers 54A'–C' are aligned with stage couplers 148A–C. A second satellite, in this case satellite 10', is then placed within fairing 52 above satellite 10. Satellite 10 is positioned to align couplers 54A–C with couplers 54A'–C' and with stage couplers 148A–C. Satellites 10 and 10' are then brought together until couplers 54A–C of upper satellite 10 contact couplers 54A'C' of lower satellite 10'. In this position, the cone portions of the lower shear fittings of the upper satellite couplers 54A–C are placed within the cup portions of the upper shear fittings of the lower satellite couplers 54A'–C'. For example, as shown in FIG. 4, cone portions 126A and 126B of shear fittings 110A and 110B in coupler 54A are positioned within cup portions 139A' and 139B' of shear fittings 108A' and 108B' in coupler 54A'. Each of the upper satellite couplers 54A–C is then bolted to the corresponding lower satellite coupler 54A'–C' by a bolt 152 which is threaded through bolt openings 100' and 102 into separation nut 106. The remaining couplers, 54B–C and 54B'–C' are bolted together in the same manner. Each bolt is initially preloaded with respect to nut 106 to a predetermined torque chosen to ensure that the cones 126A–B of shear fittings 110A–B remain seated within the cups 139A'–B' of shear fittings 108A'–B', of the subjacent satellite (or, in the case of satellite 10', within the cups of shear fittings 108A'–B' of couplers 148A–C of the subjacent booster stage 150). The cones 126A–B typically have a clearance of about 0.020 inches when initially installed within the cups 139A'–B' of the subjacent shear fittings. After two adjacent couplers, such as couplers 54A and 54A', are bolted together, a liquid shim in the form of an epoxy adhesive is added around the lower wall portions 126A–B to provide a matched joint between shear fittings 110A–B and shear fittings 108A'–B'. Hysol's EA 9309.3NA is a suitable epoxy adhesive for forming the shim between the mated shear fittings, such as shear fittings 110A–B and 108A'–B'.

After couplers 54A–C of upper satellite 10 are bolted to couplers 54A'–C' of lower satellite 10', compression springs 144A and 144B are mounted within the continuous chambers formed between couplers 54A–C and 54A'–C'. Each bolted pair of couplers, such as couplers 54A and 54A' shown in FIG. 4, includes two such continuous chambers. Thus, six continuous chambers are formed when couplers 54A–C are bolted to couplers 54A'–C', two chambers for each bolted set of couplers. Six compression springs are mounted within these chambers. The spring tensioning screws are then mounted through the annular openings to restrain the compression springs within the continuous chambers. For example, referring to the matched couplers 54A and 54A' in FIG. 4, compression spring 144A is mounted within the continuous tubular chamber extending between shear fitting 110A and 108A' and compression spring 144B is mounted within the continuous chamber extending between shear fitting 110B and 108B'. Tensioning screws 146A' and 146B' restrain springs 144A and 144B within their respective chambers. After all six compression springs have been mounted and secured within their respective chambers, the compression load of the springs is adjusted by adjusting the position of the tensioning screws within the chambers. In the preferred embodiment, the compression load of all six springs associated with the three sets of couplers adjoining two satellites is adjusted to give a combined total compression load of approximately 240 pounds. The stacked configuration of the satellites within the fairing, such as satellites 10 and 10' in fairing 52, is completed when each satellite has been coupled to the adjacent satellite or satellites in the described manner.

The stacked, secured relationship of the upper and lower satellite couplers 54A–C and 54A'–C' thus forms three load carrying columns that secure the satellites within fairing 52. The spherical or otherwise suitably tapered configuration of cones 126A–B and cups 139A'–B' transfers only axial and shear loads and does not transfer moment loads when the satellites are stacked and secured together in the described manner. Consequently, the stresses across the interface of matched shear fittings, 110A and 108A', and matched shear fittings 110B and 108B' is minimized due to the reduction in local bending moment loads.

After launching a vehicle which includes a plurality of satellites stacked within fairing 52 in the described manner, fairing 52 separates from the stacked satellites in a conventional fashion or as described in co-pending patent application Ser. No. 07/970,363, filed Nov. 2, 1992 for a "Frangible Joint Separation System," which is assigned to the same assignee of the present application, the disclosure of which is hereby incorporated by reference. Thereafter, beginning with the top-most satellite, the satellites are successively deployed from the stack by activating the separation nuts 106 securing each satellite to the subjacent satellite or to stage 150. The separation nuts 106 release the bolts 152 by a non-explosive actuation. The bolt catchers 104 and 104' shown in FIG. 4 catch the released bolts 152 thereby ensuring that the bolts and nuts remain attached to the satellites and do not damage or interfere with the operation of the satellites. After all three of the bolts securing the top-most satellite to the adjacent satellite or to stage 150 have been released, the compression load of the six compression springs extending between the top-most satellite and the adjacent satellite or stage 150 accelerates top-most satellite away from the remaining satellites in the stack, or if none, from stage 150. Subsequently, when the satellite has separated the desired distance, thrusters 37 (FIG. 1) can be used to give the satellite the desired final orbit velocity.

Whereas the present invention has been described with respect to specific embodiments thereof, it will be understood that various changes and modifications will be suggested to one skilled in the art and it is intended that the invention encompass such changes and modifications as fall within the scope of the appended claims.

What is claimed is:

1. A satellite having a stackable configuration, said satellite comprising:

a shelf for mounting equipment;

first and second panels:

a perimeter wall attached to and extending at an angle from said shelf, said perimeter wall having first and second opposing edges, an inner face and an outer face, said inner face defining an interior of said satellite;

first and second attachment means for pivotally attaching, respectively, said first and second panels to said satellite such that said first and second panels are pivotable about first and second axes, respectively, between a closed configuration wherein said first and second panels extend at a first angle with respect to said shelf and an open configuration wherein said first and second panels extend at a second, greater angle with respect to said shelf, and such that said first and second panels also are pivotable about third and fourth axes, respectively, wherein said first and second axes are not parallel to said third and fourth axes, whereby each of said first and second panels is pivotable about two separate, non-parallel axes; and     wherein said first and second attachment means further comprises first and second opposed pintles, said first pintle extending outwardly from said interior, said second pintle extending outwardly from said interior in a direction opposite said first pintle, said first pintle being operably attached to said first panel, and said second pintle being operably attached to said second panel, and wherein said first and second pintles, respectively, define said third and fourth axes and wherein said satellite further comprises means for rotating said first and second panels about said third and fourth axes.

2. The satellite of claim 1 wherein said second angle between each of said first and second panels and said shelf is substantially equal to 90° when said first and second panels are in said open configuration.

3. The satellite of claim 1 further comprising means for restraining said first and second panels in said closed configuration.

4. The satellite of claim 1 wherein said perimeter wall is attached to said shelf at one of said first and second edges.

5. The satellite of claim 1 further comprising:

an antenna pivotally attached to said satellite and movable between a retracted position wherein said antenna is contained within said interior of said satellite and an extended position wherein said antenna extends outwardly from said outer face of said perimeter wall.

6. The satellite of claim 5 further comprising means for restraining said antenna in said retracted position.

7. The satellite of claim 5 further comprising means for moving said antenna from said retracted position to said extended position.

8. The satellite of claim 5 further comprising means for pivoting said satellite about a fifth axis defined by said antenna when said antenna is in said extended position.

9. The satellite of claim 1 wherein said second angle between said first panel and said shelf is substantially the same as said second angle between said second panel and said shelf.

10. The satellite of claim 1 wherein said second angle between said first panel and said shelf is not equal to said second angle between said second panel and said shelf.

11. The satellite of claim 1 wherein each of said third axis and said fourth axis is substantially perpendicular, respectively, to each of said first axis and said second axis.

12. The satellite of claim 1 wherein said third and fourth axes are substantially co-axial.

13. The satellite of claim 1 wherein said perimeter wall has a height selected such that said satellite has a generally oblate configuration.

14. A stack of satellites comprising:

a plurality of satellites, each of said satellites comprising a shelf for mounting equipment, a perimeter wall attached to and extending at an angle from said shelf, said perimeter wall having first and second opposing edges, an inner face and an outer face, said inner face defining an interior of said satellite, and a plurality of coupling devices attached to and positioned along said perimeter wall;

wherein each of successive ones of said plurality of satellites is positioned such that each of said coupling devices of each of said successive ones of said plurality of satellites overlies and contacts one of said coupling devices thereby forming a plurality of support beams positioned along the perimeter of said stack of satellites, each said support beam comprising, a plurality of coupling devices positioned end-to-end.

15. The stack of satellites of claim 14 wherein each of said plurality of coupling devices comprises:

a bracket attached to said perimeter wall, said bracket including first and second flanges;

a first pair of shear fittings attached to and extending through said first bracket flange;

a second pair of shear fittings attached to and extending within said second bracket flange, said second pair of shear fittings being positioned on said bracket substantially opposite said first pair of shear fittings;

wherein each of said first pair of shear fittings comprises an extension member extending beyond said first bracket flange away from said first bracket flange and including a first portion, a second portion, and a terminating surface, said first portion extending between said first bracket flange and said second portion, said second portion extending between said first portion and said terminating surface, said second portion having a diameter which decreases regularly from said first portion to said terminating surface; and wherein each of said second pair of shear fittings comprises a cup-shaped extension, each of said cup-shaped extensions including a sloping inner wall defining an annular recess, each of said annular recesses having a configuration which is adapted to receive said decreasing diameter of said second portion of one of said first pair of shear fittings.

16. The stack of claim 15 wherein each of said pair of first shear fittings further comprises a shaft extending from said first bracket flange toward said second bracket flange and wherein each of said pair of second shear fittings further comprises a shaft extending from said second bracket flange toward said first bracket flange.

17. The stack of claim 16 wherein each of said first pair of shear fittings further comprises an inner wall extending from said terminating surface through said shaft of said first shear fitting, said inner wall defining an opening in said terminating surface and a chamber within said shear fittings and wherein each of said second pair of shear fittings further comprises an inner wall extending through said shaft of said second shear fitting and defining an opening in said annular recess, an opening in said shaft and a chamber within said second shear fitting.

18. The stack of claim 17 wherein each of said pair of second shear fittings further comprises a compression spring and spring restraining means for restraining said compression spring within said chambers of said shear fittings.

19. The stack of claim 15 wherein said first bracket flange further comprises a centrally located bore hole and wherein said second bracket further comprises a centrally located bore hole, said bore hole of said first bracket flange being substantially opposite to said bore hole of said second bracket flange.

20. The stack of claim 19 wherein each of said coupling devices further comprises a separation nut attached to said first bracket flange and extending toward said second bracket flange, said separation nut being positioned to coincide with said bore hole of said first bracket flange.

21. The stack of claim 14 wherein each of said plurality of coupling devices comprises:

a bracket attached to one of said satellites, said bracket including first and second flanges, said first flange being positioned on an opposite end of said bracket from said second flange;

a first shear fitting attached to and extending through said first bracket flange;

a second shear fitting attached to and extending within said second bracket flange, said second shear fitting being positioned on said bracket substantially opposite said first shear fitting;

wherein said first shear fitting comprises an extension member extending beyond said first bracket flange away from said first bracket flange and including a first portion and a tapered second portion; and wherein said second shear fitting comprises an extension member, said extension member including a concave recess adapted to receive said tapered second portion of said first shear fitting.

22. The stack of claim 15 wherein each of said second pair of shear fittings further comprises an annular flange at an end of said extension.

23. The stack of claims 21 wherein said tapered second portion of said first shear fitting further comprises a section of a sphere.

24. A coupling device for coupling satellites in a stowed configuration, the satellites being of the type including a perimeter wall having first and second opposed edges, said coupling device comprising:

a bracket attachable to the perimeter wall, said bracket including first and second flanges, a first pair of shear fittings attached to and extending within said first bracket flange;

a second pair of shear fittings attached to and extending within said second bracket flange, said second pair of shear fittings being positioned on said bracket substantially opposite said first pair of shear fittings;

wherein each of said first pair of shear fittings comprises an extension member extending beyond said first bracket flange in a direction, away from said first bracket flange, said extension member including a first portion, a second portion, and a terminating surface, said first portion extending between said first bracket flange and said second portion, said second portion extending between said first portion and said terminating surface, said second portion having a diameter which decreases regularly from said first portion to said terminating surface; and wherein each of said second pair of shear fittings comprises a cup-shaped extension, each of said cup-shaped extensions including a sloping inner wall defining an annular recess, each of said annular recesses having a configuration which is adapted to receive said decreasing diameter of said second portion of one of said first pair of shear fittings.

25. The coupling device of claim 24 wherein each of said pair of first shear fittings further comprises a shaft extending from said first bracket flange toward said second bracket flange and wherein each of said pair of second shear fittings further comprises a shaft extending from said second bracket flange toward said first bracket flange.

26. The coupling device of claim 25 wherein each of said first pair of shear fittings further comprises an inner wall extending from said terminating surface through said shaft of said first shear fitting, said inner wall defining an opening in said terminating surface and a chamber within said shear fitting and wherein each of said second pair of shear fittings further comprises an inner wall extending through said tubular shaft of said second shear fitting and defining an opening in said annular recess, an opening in said shaft and a chamber within said second shear fitting.

27. The coupling device of claim 26 wherein each of said pair of second shear fittings further comprises a compression spring and spring restraining means for restraining said compression spring within said chamber of each of said shear fittings.

28. The coupling device of claim 27 further comprising means for adjusting compression of said compression spring.

29. The coupling device of claim 27 wherein said first bracket flange further comprises a centrally located bore hole and wherein said second bracket further comprises a centrally located bore hole, said bore hole of said first bracket flange being substantially opposite to said bore hole of said second bracket flange.

30. The coupling device of claim 29 wherein each of said coupling devices further comprises a non-explosive separation nut attached to said first bracket flange and extending toward said second bracket flange, said separation nut being positioned to coincide with said bore hole of said first bracket flange.

31. The coupling device of claim 24 wherein said second portion of said first pair of shear fittings further comprises a section of a sphere.

32. A coupling device for coupling satellites in a stowed configuration comprising:

a bracket attachable to a satellite, said bracket including first and second flanges, said first flange being opposite of said second flange;

a first shear fitting attached to said first bracket flange;

a second shear fitting attached to said second bracket flange, said second shear fitting being positioned on said bracket substantially opposite said first shear fitting;

wherein said first shear fitting comprises an extension member extending beyond said first bracket flange in a direction away from said first bracket flange, said extension member including a first portion, a second portion, and a terminating surface, said first portion extending between said first bracket flange and said second portion, said second portion extending between said first portion and said terminating surface, said second portion having a tapered portion which decreases from said first portion to said terminating surface; and wherein said second shear fitting comprises an extension having a sloping inner wall defining a substantially concave recess, said concave recess having a configuration adapted to receive said tapered portion of said first shear fitting.

33. The coupling device of claim 32 wherein said tapered portion of said second portion of said first shear fitting further comprises a section of a sphere.

* * * * *